United States Patent
Niikawa et al.

(10) Patent No.: US 7,614,295 B2
(45) Date of Patent: Nov. 10, 2009

(54) FLOW SENSOR

(75) Inventors: Koichiro Niikawa, Tokyo (JP);
Yasuharu Ooishi, Tokyo (JP); Masaki Seo, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 12/164,204

(22) Filed: Jun. 30, 2008

(65) Prior Publication Data
US 2009/0007654 A1    Jan. 8, 2009

(30) Foreign Application Priority Data
Jul. 6, 2007 (JP) .............................. 2007-178359

(51) Int. Cl.
*G01F 1/68* (2006.01)
(52) U.S. Cl. ..................................... 73/202.5
(58) Field of Classification Search ............. 73/204.21, 73/204.26, 202.5
See application file for complete search history.

(56) References Cited

U.S. PATENT DOCUMENTS

| | | | | |
|---|---|---|---|---|
| 4,404,859 A | * | 9/1983 | Ohsawa et al. ........... | 73/861.18 |
| 4,936,144 A | * | 6/1990 | Djorup ..................... | 73/170.12 |
| 4,981,035 A | * | 1/1991 | Hall ........................ | 73/114.32 |
| 5,329,812 A | * | 7/1994 | Tada et al. ................ | 73/204.21 |
| 6,352,011 B1 | * | 3/2002 | Fruhm ...................... | 81/438 |
| 6,401,531 B1 | * | 6/2002 | Tank et al. ............... | 73/204.21 |
| 7,107,834 B2 | * | 9/2006 | Meneghini et al. ....... | 73/204.21 |
| 7,437,926 B2 | * | 10/2008 | Kozawa et al. .......... | 73/204.21 |

FOREIGN PATENT DOCUMENTS

| | | |
|---|---|---|
| JP | 04-069521 A | 3/1992 |
| JP | 11-173896 A | 7/1999 |

\* cited by examiner

*Primary Examiner*—Jewel Thompson
(74) *Attorney, Agent, or Firm*—Darby & Darby P.C.

(57) ABSTRACT

The flow meter is equipped with first and second flow paths, provided in parallel and through which flows fluid having flowed through and being diverted from a main flow path, the flow diversion ratio among the first and second flow paths changing passively in accordance with the flow rate of fluid through the main flow path, and a flow rate sensor provided on at least one of the first and second flow paths. The first and second flow paths are formed, for example, as flow paths having different flow path cross-sectional areas, or alternatively are formed from mesh elements provided with mesh-free areas on a portion thereof. Alternatively, one of the either the first or second flow path is realized with a paddle mechanism incorporated therein.

14 Claims, 10 Drawing Sheets

FLOW SENSOR

CROSS REFERENCE TO RELATED APPLICATIONS

The present application claims priority under 35 U.S.C. §119 to Japanese Patent Application No. 2007-178359, filed Jul. 6, 2007. The contents of the application is incorporated herein by reference in its entirety.

TECHNICAL FIELD

The present invention relates to a flow meter wherein the flow path structure is improved so as to increase the detection sensitivity of a flow rate sensor to minute flow rates, and the detection sensitivity to large flow rates is reduced so as to expand the dynamic range of measurement with the aforementioned flow rate sensor.

BACKGROUND OF THE INVENTION

In a flow meter that uses a thermal type flow rate sensor, it has been proposed to increase the detection sensitivity thereof, to compartmentalize the interior of a flow path having a flow rate sensor attached to a wall surface thereof to detect minute flow rates into a plurality of flow paths along the direction of fluid flow so as to increase the flow velocity at the aforementioned wall surface location, and to provide a nozzle at an intermediate location on that flow path so as to increase the flow velocity at the nozzle (see Japanese Unexamined Patent Application Publication No. 4-69521 and Japanese Unexamined Patent Application Publication No. 11-173896, for example).

SUMMARY OF THE INVENTION

As the detection sensitivity to minute flow rates is increased as described above, detection sensitivity to large flow rates will also increase, causing a problem in that during the throughflow of a large flow rate, the output of the flow rate sensor will saturate, making measurement impossible. For this reason, in a gas meter or the like having a maximum measurable flow rate of approximately 30,000 L/h, for example, minute leakage flow rates of approximately 5 L/h were difficult to detect with good accuracy.

The present invention was devised in consideration of these types of circumstances, and an object thereof is to provide a flow meter capable of detecting easily and with good accuracy flows ranging from minute flow rates such as gas leaks to large flow rates during the state of normal gas usage.

In order to achieve the above-stated object, the flow meter of the present invention comprises a flow path structure has been improved so that flow rates ranging from a minute flow rate of approximately 5 [L/h] to a large flow rate of approximately 30,000 [L/h], for example, can be measured without causing the output of the flow rate sensor to saturate, and is basically characterized by <a> first and second flow paths, provided in parallel and through which flows fluid having flowed through and being diverted from a main flow path, the flow diversion ratio among the first and second flow paths changing passively in accordance with the flow rate of fluid through the main flow path; and <b> a flow rate sensor provided on at least one of the first and second flow paths. Furthermore, the phrase "flow diversion ratio changes" means that no external supply of electric current or other energy is needed to cause the flow diversion ratio to change.

The first and second flow paths are formed by spatially compartmentalizing the flow path cross-section of the main flow path along the direction of fluid flow through the main flow path, and are configured such that, for example, at least one of the first and second flow paths is caused to passively change its flow path resistance to the fluid in accordance with the flow rate of the fluid through the main flow path, and the flow diversion ratio among the first and second flow paths is caused to change.

Specifically, the first and second flow paths are formed by compartmentalizing the flow path cross-section of the main flow path with partitions provided along the direction of fluid flow through the main flow path, for example, and in particular, the first flow path is formed preferably as a flow path space having a smaller flow path cross-section than that of the second flow path. In particular, the first flow path, after having secured an inlet zone of a predetermined length for the fluid flow, is provided downstream from the inlet zone with a narrow area that constricts the cross-sectional area of that flow path, and the flow rate sensor is incorporated preferably into this narrow area. In particular, in the first flow path, an inlet zone of a predetermined length for the fluid flow is secured, a narrow area that constricts the flow path cross-sectional area is provided downstream from that inlet zone, and preferably the flow rate sensor is incorporated into this narrow area.

Alternatively, the first flow path comprises a laminar flow region formed as a region smaller than the flow path cross-section of the main flow path, for example, and formed downstream of a mesh-free area provided on a portion of a mesh element provided so as to cover the entire flow path cross-section of the main flow path. Then the second flow path is formed by equivalently compartmentalizing the space between the laminar flow region and the flow path cross-section of the main flow path, and is realized as a region outside the laminar flow region downstream from the mesh element. Incidentally, a plurality of the mesh elements provided with mesh-free areas may also be provided such that the locations of the mesh-free areas thereof are aligned in the throughflow direction of the fluid.

Furthermore, by compartmentalizing the flow path cross-section of the main flow path with partitions provided along the fluid throughflow direction of the main flow path to form the first and second flow paths, and by providing the second flow path with a paddle mechanism that changes the flow path resistance for the fluid according to the velocity of fluid flow, the first and second flow paths can be configured such that the flow diversion ratio between the first and second flow paths varies according to the second flow path resistance, which changes according to the degree of opening of the paddle mechanism.

Moreover, the second flow path may preferably be provided with grid-shaped partition plates that compartmentalize the second flow path into a plurality of parallel minute flow paths along the fluid flow. Also preferable is that the grid-shaped partition plates are realized as grid elements of a predetermined length, a plurality of the grid elements are arranged in series in the fluid throughflow direction of the second flow path, and a mesh element is interposed between each of these grid elements. Moreover, the provision of a second flow rate sensor in the second flow path is useful in compensating for the degradation in measurement accuracy of large flow rates when measuring the flow rate in conjunction with this second flow rate sensor.

With a flow meter having the above-described basic configuration, the ratio of flow diverted among a first flow path and a second flow path provided in parallel changes passively according to the flow rate of fluid flowing through a main flow path. Accordingly, in the case when, for example, the fluid flowing through the main flow path is small, the flow diversion ratio for the first flow path has a high value, and as the flow of fluid through the main flow path increases, the flow diversion ratio for the first flow path decreases, and the provision of a flow rate sensor in the first flow path enables that flow rate sensor to detect flows ranging from minute flow rates to large flow rates.

Namely, in the above case, causing nearly all of the aforementioned fluid to flow through the first flow path when the flow rate through the main flow path is minute enables that minute flow rate to be detected reliably, and causing the majority of that fluid to flow through the second flow path when the flow rate is large enables the flow rate through the first flow path to be constrained. Accordingly, as the fluid flow rate through the main flow path increases, since the flow rate through the first flow path can be constrained in accordance with the above-described flow diversion ratio, all flows—from minute flow rates to large flow rates—can be detected without causing saturation of the flow rate sensor.

Moreover, in the aforementioned first flow path, after securing an inlet zone for the aforementioned fluid flow, if a narrow area that constricts the cross-sectional area of that flow path is provided and if the aforementioned flow rate sensor is incorporated into this narrow area, the flow velocity of the minute flow guided to the first flow path can be sped-up in the aforementioned narrow area. As a result, the sensitivity of detection by the flow rate sensor can be increased substantially, and minute flow rates can be detected easily. In particular, the abovementioned narrow area acts as a flow path resistance for large flow rates and is therefore extremely effective for passively changing the flow diversion ratio among the first and second flow paths. Moreover, the abovementioned mesh element, the grid element, and the paddle mechanism act as flow path resistances for minute flow rates and are therefore extremely effective for passively changing the flow diversion ratio among the first and second flow paths.

DETAILED DESCRIPTION OF THE INVENTION

The flow meter of the present invention is described below with reference to drawings. The term "fluid" is used throughout the specification and is defined as a liquid, a gas, or both depending on the context. Further, the fluid can be Newtonian or non-Newtonian.

This flow meter is configured as a suitable gas meter using a thermal type flow rate sensor that detects the mass flow rate of a gas flow, for example. Although not expressly shown, the aforementioned thermal type flow rate sensor is comprised, for example, of a pair of thermosensitive resistive elements provided in the direction of fluid flow between heat-generating resistive elements and mounted on a thin diaphragm formed on a silicon or glass substrate, and is configured so as to detect the flow rate (flow velocity) of the aforementioned fluid from changes in the distribution of temperature near the sensor surface due to the flow of fluid along the sensor surface.

Figure 1:
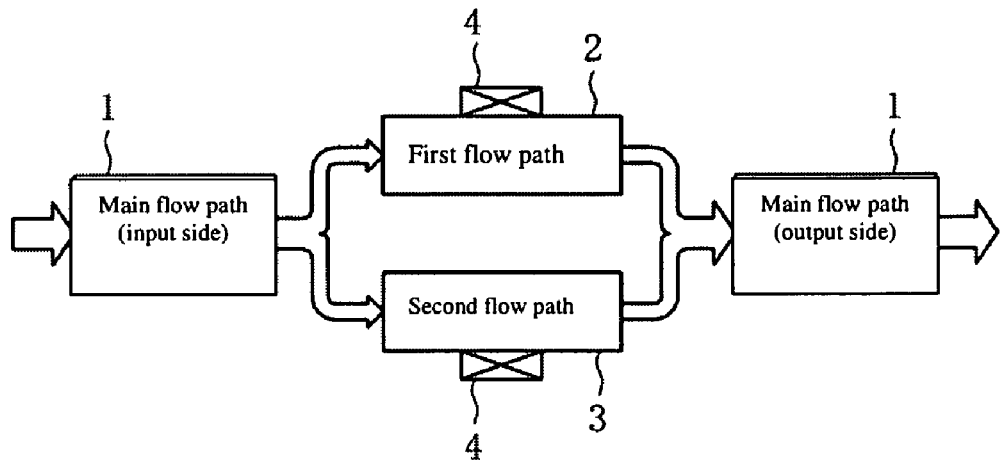
FIG. 1 shows a basic configuration of a flow meter of the present invention.
Figure 2:
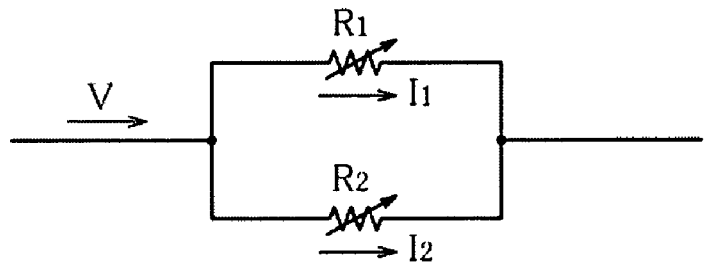
FIG. 2 shows an equivalent view of the flow path structure of the flow meter shown in FIG. 1.
Figure 3:
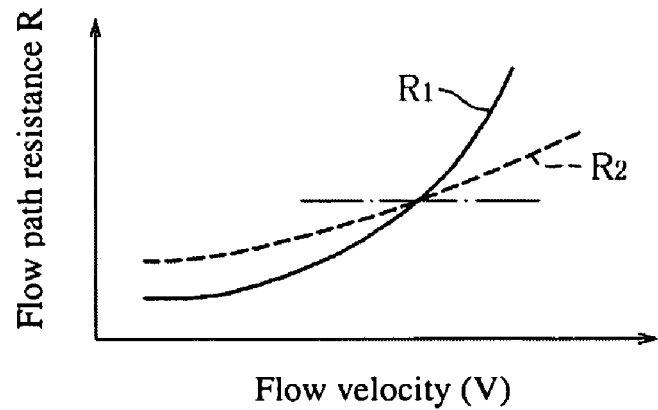
FIG. 3 shows the change characteristics of flow path resistance corresponding to the flow rate of the first and second flow paths in the flow meter shown in FIG. 1.
Figure 4:
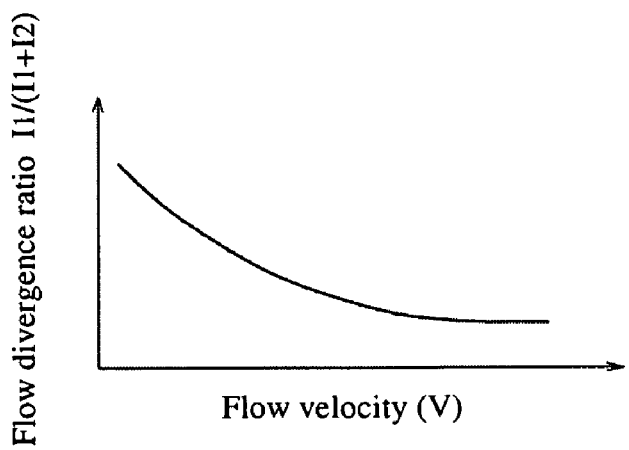
FIG. 4 shows the change in flow diversion ratio among the first and second flow paths in the flow meter shown in FIG. 1.

FIG. 1 shows the basic configuration of the flow meter of the present invention. At an intermediate location on a main flow path 1 through which a fluid (such as gas) flows, the aforementioned fluid is diverted and flows through the first and second flow paths 2, 3 which are provided in a parallel arrangement. In particular, the aforementioned first and second flow paths 2, 3 comprise the equivalent of a resistive circuit such as shown in FIG. 2 wherein a flow path resistance R1 of the first flow path 2 and a flow path resistance R2 of the second flow path 3 are caused to change passively according to a fluid flow rate (flow velocity) V through the main flow path 1, and as a result, cause a change in the flow diversion ratio among the first and second flow paths 2, 3. Thus, the flow diversion ratio among the first and second flow paths changes non-mechanically based on the flow rate of the fluid. In other words, the first and second flow paths 2, 3 comprise a flow path structure wherein the flow path resistances R1, R2 change passively as shown in FIG. 3 according to the fluid flow rate (flow velocity) V through the main flow path 1, for example, and the fluid is diverted into flow rates I1, I2 that flow through the respective flow paths according to the aforementioned flow path resistances R1 and R2, and the flow diversion ratio [I1/(I1+I2)] thereof changes according to the fluid flow rate (flow velocity) V as shown in FIG. 4.

Furthermore, either one of the first or second flow paths 2, 3 may passively change their flow path resistance R1 or flow path resistance R2 according the fluid flow rate (flow velocity) V through the main flow path 1. In this case, the ratio of flow diversion [I1/(I1+I2)] among the first and second flow paths will change according to the change in either flow path resistance R1 or R2. Also, a thermal type flow rate sensor 4 is incorporated into at least one of the above-described first and second flow paths 2, 3 of a flow meter having this type of flow path structure.

Figure 5:
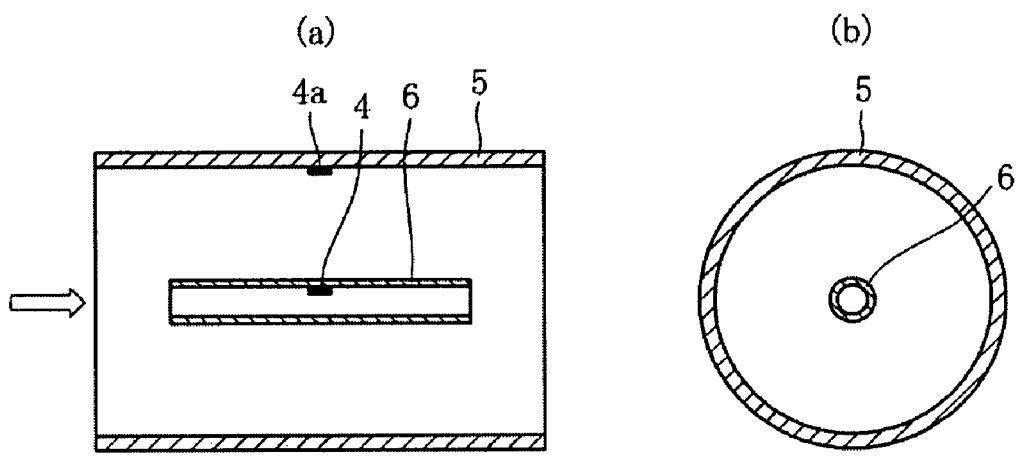
FIG. 5 shows a first embodiment of the flow path structure in the flow meter shown in FIG. 1.

The aforementioned first and second flow paths 2, 3 are formed as shown in FIGS. 5(a), (b), for example, wherein inside a pipe (large diameter pipe) 5 forming the main flow path 1, a small diameter pipe 6 acting as a partition is provided in the direction of flow thereof so as to compartmentalize the interior space of the aforementioned pipe 5 in the cross-sectional direction of the flow path. Furthermore, FIG. 5(a) shows a longitudinal cross-section of the flow path structure, and FIG. 5(b) shows the transverse cross-sectional structure of that flow path.

Then, in this case, due to the difference in flow path cross-sectional areas of the first and second flow paths 2, 3 formed by compartmentalizing the interior space of the pipe 5 with the aforementioned small diameter pipe 6, the difference in velocity distributions of laminar flows in the interior of the pipe 5, and changes in the flowrate gradient due to the small diameter pipe 6 and the like, the flow path resistances R1, R2 of the first and second flow paths 2, 3 change differently according to the fluid flow rate (flow velocity) V through the pipe 5.

Specifically, in the case of a low fluid flow rate (flow velocity) V through the pipe 5, the flow path resistance R1 of the first flow path 2 having a minute flow path cross-sectional area and being formed as the space inside the small diameter pipe 6 is only slightly larger than the flow path resistance R2 of the second flow path 3 having a large flow path cross-sectional area and being formed as the space outside the small diameter pipe 6. However, in the case where the small diameter pipe 6 is provided at the center of the pipe 5, because the flow velocity at the center of the pipe 5 originally exhibits a velocity distribution which is slightly faster than that of the surrounding area, the flow velocities through each of the first and second flow paths 2, 3 are approximately equal, and in essence, the flow path resistances R1, R2 of the first and second flow paths 2, 3 can be considered to be approximately the same.

However, if the aforementioned flow rate (flow velocity) V increases, contact resistance between the wall surface of the small diameter pipe 6 and the fluid will cause the flow rate gradient to increase, and the flow path resistance R1 of the first flow path 2 having a minute flow path cross-sectional area will increase. In other words, the flow path resistance R1 changes passively according to the flow. Consequently, as the fluid flow rate (flow velocity) V through the pipe 5 increases, the fluid encounters greater difficulty in flowing through the first flow path 2, and the flow diversion ratio with the second flow path 3 changes.

Thus, in the case where the fluid flow rate (flow velocity) V through the pipe 5 is minute, since that flow is simply diverted according to the flow path cross-sectional areas of the first and second flow paths 2, 3, the provision of a flow rate sensor 4 in the first flow path 2 enables the aforementioned minute flow to be detected reliably by that flow rate sensor 4. Moreover, in the case where the fluid flow rate (flow velocity) V through the pipe 5 has increased, the flow diversion ratio among the first and second flow paths 2, 3 changes according to the increase in flow path resistance R1 of the first flow path 2, and the increase in flow rate of the fluid through the first flow path 2 is constrained so that the flow can be detected without causing the flow rate sensor 4 to saturate.

As this time, compensation for the deterioration in large flow detection accuracy by the flow rate sensor 4 provided in the first flow path 2 can be achieved by providing a second flow rate sensor 4a, capable of detecting large flow rates with high accuracy, in the second flow path 3. However, because the aforementioned second flow rate sensor 4a cannot detect minute flow rates with high accuracy, the detection of minute flow rates is relegated to the flow rate sensor 4 provided in the first flow path 2 as described above.

Figure 6:
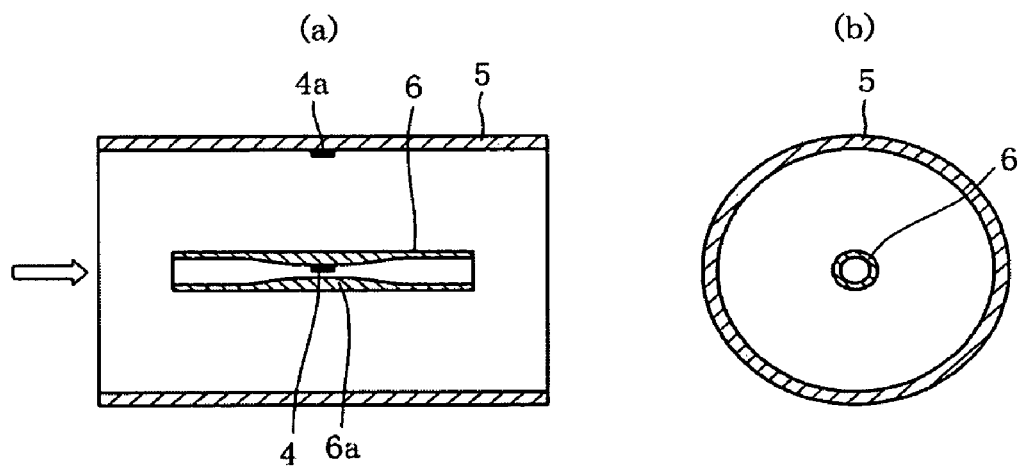
FIG. 6 shows a second embodiment of the flow path structure in the flow meter shown in FIG. 1.

Furthermore, as shown in FIGS. 6(a), (b), at an intermediate location in the small diameter pipe 6, the provision of a narrow area (nozzle) 6a that constricts the pipe diameter (flow path cross-sectional area) enables an even greater change in the flow path resistance R1 of the first flow path 2 as the fluid flow rate (flow velocity) V through the pipe 5 increases. In other words, if a narrow area (nozzle) 6a exists at an intermediate location in the small diameter pipe 6, the fluid constricted in the small diameter pipe 6 is compressed while flowing through the interior of the small diameter pipe 6 and flows through the narrow area 6a with an increased flow velocity. At this time, if the fluid flow rate (flow velocity) V through the pipe 5 is low, the degree of compression of the fluid inside the small diameter pipe 6 is small, and as the aforementioned flow rate (flow velocity) V increases, the degree of compression of the fluid inside the small diameter pipe 6 becomes larger. This means that, when the flow is small, the flow path resistance R1 of the first flow path 2 having a small flow path cross-sectional area is small, and that as the flow increases, the aforementioned flow path resistance R1 of the first flow path 2 will increase gradually. On the other hand, the flow path resistance R2 of the second flow path 3 having a large flow path cross-sectional area hardly changes at all regardless of the change in the flow rate (flow velocity) V.

Accordingly, as a result of the aforementioned flow path structure in which the flow rate sensor 4 is provided in the first flow path 2, the flow diversion ratio among the first and second flow paths 2, 3 is caused to change according to the flow, and because the flow through the first flow path 2 can be constrained when the flow is large, flows ranging from small flow rates to large flow rates can be detected reliably, without causing the flow rate sensor 4 to saturate. In particular, by providing the flow rate sensor 4 in the above-described narrow area 6a, the velocity of fluid flow through the first flow path 2 at the narrow area 6a can be increased so that even minute flow rates can be detected with high sensitively.

Moreover, instead of providing different flow rate regions along the longitudinal direction of the flow path as in the prior art, the aforementioned flow rate sensor 4 and the aforementioned second flow rate sensor 4a are provided in the same circumferential direction on the flow path peripheral surface. Consequently, in the prior art, a flow path length necessary for each flow rate region was required along the longitudinal direction for both the large flow rate region and a small flow rate region, but with the present invention, when providing different flow rate regions, each flow rate sensor is provided in the same circumferential direction on the flow path peripheral surface so that only a single flow path length is required in the flow rate regions. Thus, since the flow path length does not become elongated as in the prior art, this configuration enables miniaturization of the flow meter.

Figure 7:
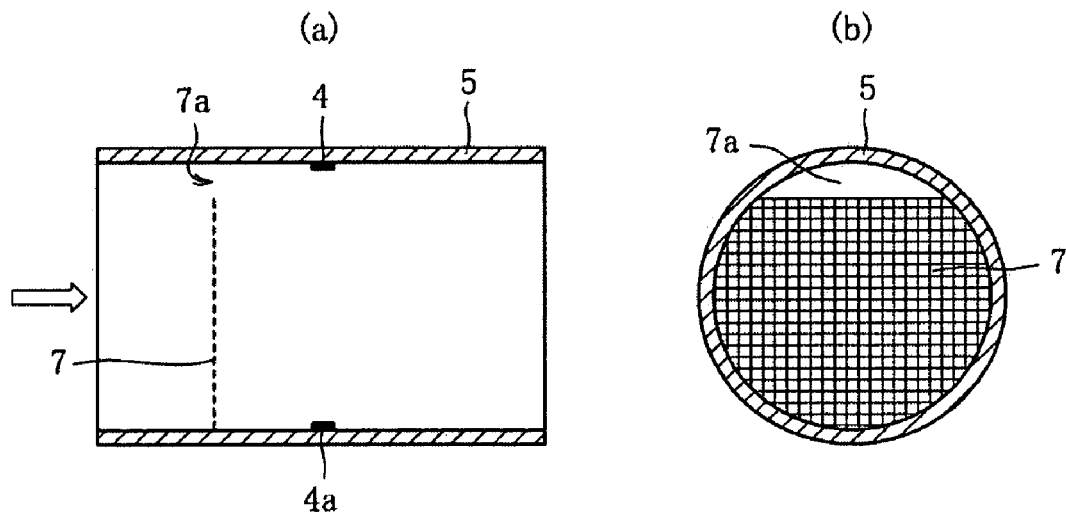
FIG. 7 shows a third embodiment of the flow path structure in the flow meter shown in FIG. 1.

Incidentally, as shown in FIGS. 7(a), (b), for example, the provision of a mesh element 7 in the interior of the pipe 5 that forms the main flow path 1 so as to cover the flow path cross-sectional areas of the aforementioned first and second flow paths 2, 3 enables the space at the downstream side of the mesh element 7 to be compartmentalized in the flow path cross-sectional direction of the aforementioned pipe 5. Furthermore, FIG. 7(a) shows the longitudinal cross-section of the flow path structure, and FIG. 7(b) shows the transverse cross-sectional structure of that flow path.

In a portion of the aforementioned mesh element 7 is formed a mesh-free area (notch) 7a, and this mesh-free area 7a is positioned on a portion of the flow path cross-section surface of the aforementioned pipe 5, and is provided perpendicularly to the direction of fluid flow in the aforementioned pipe 5. With the mesh element 7 incorporated into the pipe 5 in this manner, the aforementioned mesh-free area 7a acts as a region in which the flow path resistance R1 is zero [0], and the mesh element 7 itself functions as a passive body that changes the flow path resistance R2 thereof according to the flow rate (flow velocity) V of fluid flowing through the pipe 5.

With this type of mesh element 7, the fluid flows formed in regions downstream from the mesh element 7 are formed as different sites by equivalently compartmentalizing the interior of the pipe 5 into the aforementioned first and second flow paths 2, 3. Specifically, the first flow path 2 passes through the mesh-free area 7a and is realized as a laminar flow region formed downstream of the mesh-free area 7a. Moreover, the second flow path 3 is realized as the region outside the aforementioned laminar flow region downstream of the aforementioned mesh element 7, or in other words, as the throughflow region of fluid that has passed through the mesh element 7.

With a flow path structure equipped with this type of mesh element 7, the fluid flowing through pipe 5 receives different flow path resistances according to whether that fluid passes through the mesh-free area 7a or passes through the mesh element 7. In other words, in the case of a minute fluid flow rate (flow velocity) V through the pipe 5, since there is a large flow path resistance (pressure drop) at the mesh element 7, nearly all of the aforementioned fluid flows through the mesh-free area 7a which has no flow path resistance. Accordingly, there is an increase in the flow rate through the region formed by the first flow path 2 downstream of the mesh-free area 7a, while the flow rate through the region formed by the second flow path 3 downstream of the mesh element 7 becomes essentially zero. However, if the fluid flow rate (flow velocity) V through the pipe 5 increases, the fluid flow overcomes the flow path resistance (pressure drop) at the aforementioned mesh element 7 and the fluid flow rate through the mesh element 7 increases gradually, changing the flow diversion ratio of fluid passing through the mesh element 7 and the mesh-free area 7a, respectively, i.e., the flow diversion ratio of the fluid flowing into the first and second flow paths 2, 3.

Accordingly, with the provision of a flow rate sensor 4 in the first flow path 2, since in the case of a minute fluid flow rate (flow velocity) V through the pipe 5 nearly all of that minute flow will be in the first flow path 2 (mesh-free area 7a), the aforementioned flow rate sensor 4 will be able to detect reliably that minute flow rate. Moreover, in the case where the fluid flow rate (flow velocity) V through the pipe 5 has increased, some of the aforementioned fluid will flow through the mesh element 7 and into the second flow path 3, and by that portion, the flow rate through the aforementioned first flow path 2 (mesh-free area 7a) is constrained. Furthermore, as the flow path resistance R1 of the first flow path 2 increases, the flow divergence ratio among the first and second flow paths 2, 3 changes, and because the increase in fluid flow rate through the first flow path 2 is constrained, as in the above-described embodiment, the flow rate can be detected without causing the aforementioned flow rate sensor 4 to saturate.

At this time, compensation for the deterioration in large flow rate detection accuracy by the flow rate sensor 4 provided in the first flow path 2 can be achieved by providing a second flow rate sensor 4a, capable of detecting large flow rates with high accuracy, in the second flow path 3. However, in the case of a minute flow rate (flow velocity) V, there is hardly any fluid flow to the second flow path 3 and detection of the aforementioned minute flow rate with the second flow rate sensor 4a is nearly impossible. Accordingly, the detection of minute flow rates is relegated to the flow rate sensor 4 provided in the first flow path 2 (downstream from mesh-free area 7a).

Figure 8:
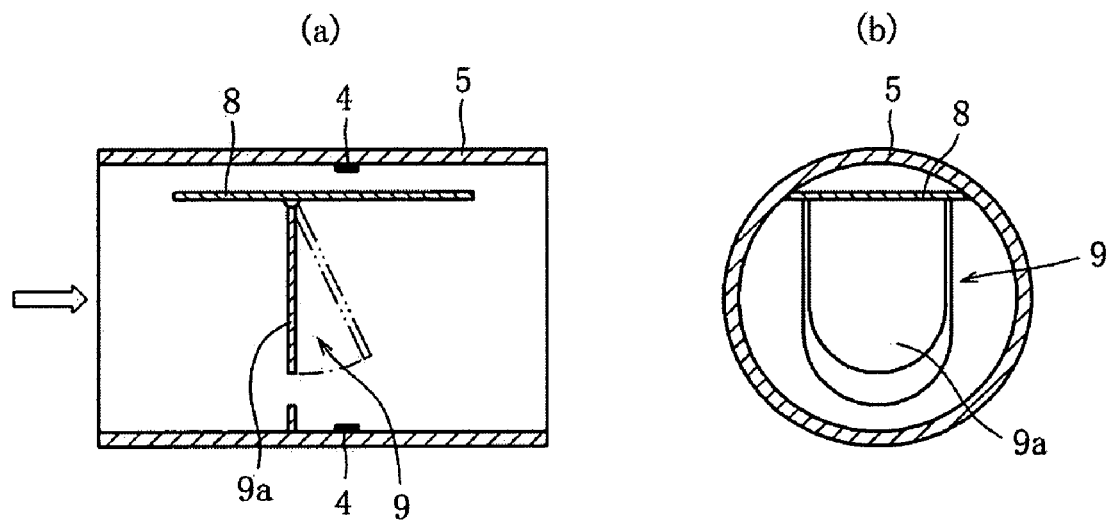
FIG. 8 shows a fourth embodiment of the flow path structure in the flow meter shown in FIG. 1.

Incidentally, the above-described first and second flow paths 2, 3 can also be realized as shown in FIGS. 8(a), (b) for example. Furthermore, FIG. 8(a) shows the longitudinal cross-section of the flow path structure, and FIG. 8(b) shows the transverse cross-sectional structure of that flow path. This flow path structure is configured in the interior of the pipe 5 that comprises the main flow path 1 by providing, along the fluid flow direction thereof, a plate-shaped partition 8 to compartmentalize the interior space of the main flow path 1 into the first and second flow paths 2, 3, and also by providing a paddle mechanism 9 by partitioning the second flow path 3 in the fluid flow direction thereof.

This paddle mechanism 9 is equipped, for example, with a valve element 9a supported so as to be freely tilting via a hinge and provided so as to obstruct the second flow path 3, and upon receiving pressure from fluid flowing through the second flow path 3, tilts to form a gap in the second flow path 3, thus comprising a flow path resistor that functions so as to allow fluid to flow through this gap. In particular, this paddle mechanism 9 causes the size (degree of opening) of the gap formed by the aforementioned valve element 9a to change according to the fluid flow rate (flow velocity) V through the second flow path 3, and exhibits the function of a variable resistive element that passively changes its flow path resistance.

In a flow meter having a flow path structure equipped with this type of paddle mechanism 9, in the case where the fluid flow rate through the main flow path 1 minute, the paddle mechanism 9 provided in the second flow path 3 obstructs the second flow path 3 and therefore the aforementioned fluid with the minute flow rate flows exclusively through the first flow path 2. Then, in accordance with an increase in the fluid flow rate through the main flow path 1, upon receiving the fluid pressure thereof, the aforementioned valve element 9a of the paddle mechanism 9 opens and the flow path resistance thereof decreases so that the aforementioned fluid diverges and flows through the first and second flow paths 2, 3.

Therefore, the provision of the flow rate sensor 4 in the first flow path 2 enables minute flow rates to be detected reliably since nearly all the fluid flows through the first flow path 2 when the flow rate is minute. Moreover, if the flow rate is increased, the valve element 9a of the paddle mechanism 9 opens as the flow rate is increased, and consequently, the flow diverges among the first and second flow paths so that the increase in fluid flow rate through the first flow path 2 is constrained. As a result, the flow rate can be detected while constraining saturation of the flow rate sensor 4, thus enabling the continuous detection of flows ranging from the above-described minute flow rate to a large flow rate.

Furthermore, in the case of a large flow rate, the flow rate through the first flow path 2 is constrained as described above, and by that portion, the accuracy of flow rate detection by the flow rate sensor 4 decreases. Therefore, compensation for the deterioration in large flow detection accuracy by the flow rate sensor 4 provided in the first flow path 2 can be achieved by providing a second flow rate sensor 4a, capable of detecting large flow rates with high accuracy, in the second flow path 3. However, in the case of a minute flow rate (flow velocity) V, there is hardly any fluid flow to the second flow path 3 so that detection of the aforementioned minute flow rate with the second flow rate sensor 4a is nearly impossible. Accordingly, the detection of minute flow rates is relegated to the flow rate sensor 4 provided in the first flow path 2.

As described in the above configuration examples referencing each of FIGS. 5(a), (b) to 8(a), (b) of the first and second flow paths 2, 3 which have a flow divergence ratio that changes according to the fluid flow rate, the flow meter of the present invention is configured with a flow rate sensor 4 incorporated into at least one of the first and second flow paths 2, 3 which have a flow diversion ratio that changes passively when a minute flow rate or a large flow rate is flowing. In particular, incorporation of the flow rate sensor 4 in the flow path side where the diversion ratio increases during a minute flow rate and decreases during a large flow rate, enables the continuous detection of flows ranging from minute flow rates to large flow rates by the flow rate sensor 4.

Specifically, by guiding nearly all of an entire minute flow rate to the flow path provided with the flow rate sensor 4 (the first flow path 2 in the above-described example), the flow velocity (the apparent flow rate) thereof is increased substantially, and consequently, the minute flow rate can be detected reliably. On the other hand, in the case of a large flow rate, by constraining the flow rate guided to the flow path (the first flow path 2) provided with the aforementioned flow rate sensor 4, an increase in flow velocity thereof is constrained, and consequently, the flow rate thereof is detected without saturating the aforementioned flow rate sensor 4. Accordingly, in the flow meter of the present invention, a single flow rate sensor 4 is continuously able to measure flow rates ranging from minute flow rates of approximately 5 [L/h] caused for example by gas leaks due to cracking or damage of the pipe 5 to large flow rates of approximately 30,000 [L/h] maximum during the state of normal gas usage, and this has many practical advantages. Moreover, compensation for the deterioration in large flow detection accuracy by the above described flow rate sensor 4 can be achieved by providing in the other flow path (the second flow path 3 in the above-described example) a large flow rate-use second flow rate sensor 4a that is capable of detecting with high accuracy the flow rate during the state of normal gas usage, thus enabling the problem-free measurement of gas flow rates in practical applications.

Moreover, instead of providing a large flow rate region and a small flow rate region individually along the longitudinal direction as had been done in the past, the aforementioned flow rate sensor 4 and the aforementioned flow rate sensor 4a are provided on the same circumferential direction on the flow path peripheral surface, and the large flow rate region and the small flow rate region are each formed with a predetermined flow path length. Accordingly, the flow path length required for forming the large flow rate measuring region and the small flow rate measuring region can be standardized. Consequently, a configuration that miniaturizes the size of the flow meter can be employed.

Figure 9:
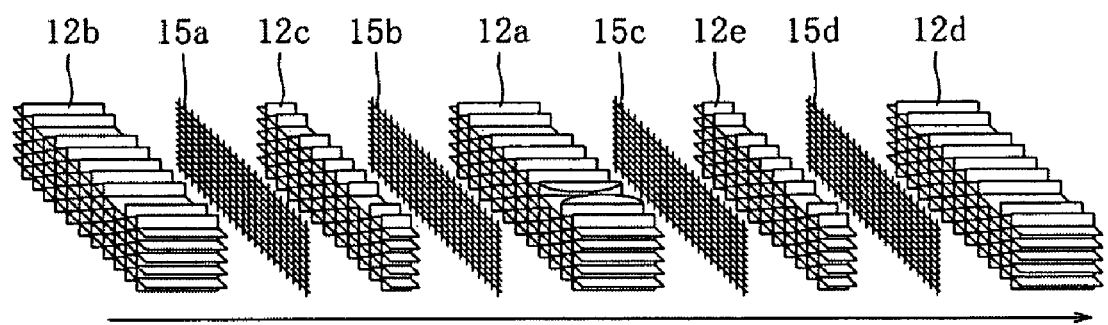
FIG. 9 shows the flow path structure of the flow meter of the first embodiment of the present invention, in an exploded diagrammatic view in the fluid throughflow direction.
Figure 10:
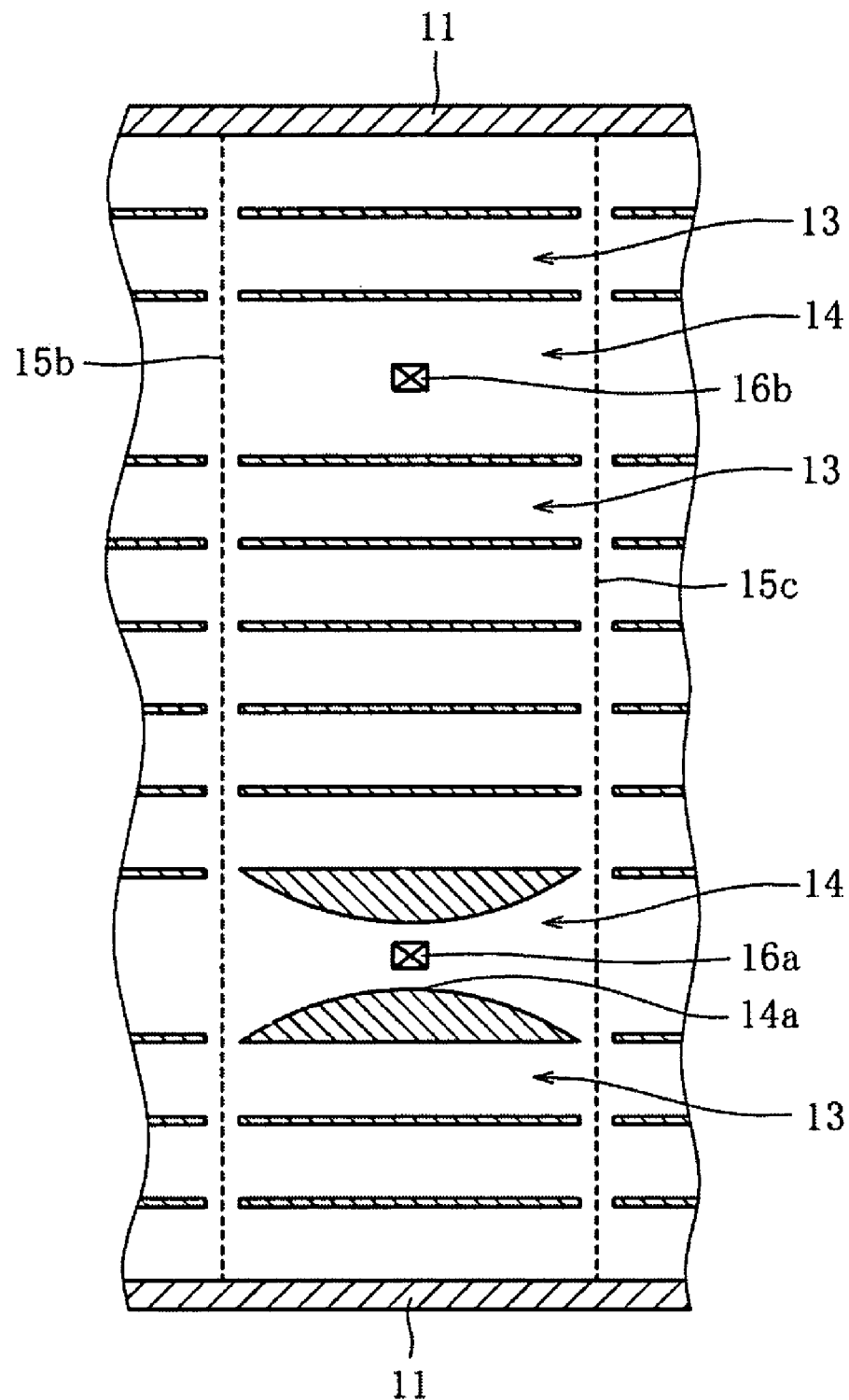
FIG. 10 shows diagrammatically the cross-sectional structure of the relevant part of the flow path in the flow meter shown in FIG. 9.

Specific configuration examples of the flow meter of the present invention are described below. FIG. 9 shows the flow path structure of a flow meter in a first embodiment of the present invention, in an exploded diagrammatic view in the fluid throughflow direction, and FIG. 10 shows a relevant part thereof in a diagrammatic view. This flow meter is configured with a grid element 12 as a main element that compartmentalizes the interior space of a pipe 11 having a rectangular shaped flow path cross-section into a plurality of minute flow paths in the flow path cross-sectional direction thereof. The abovementioned grid element 12 is configured with a plurality of plate-shaped partitions provided in parallel along the throughflow direction of the pipe 11 and assembled into a grid shape. In particular, the grid element 12 used in this embodiment includes, for example, a sensor grid element 12a that incorporates a flow rate sensor, as will be described later, first and second front grid elements 12b, 12c provided upstream from the sensor grid element 12a, and first and second rear grid elements 12d, 12d provided downstream from the sensor grid element 12a.

Incidentally, these grid elements 12 (12a, 12b to 12e), for example, arrange a plurality (multiplicity) of minute flow paths 13 constituting approximately square shaped flow path cross-sectional shapes into a matrix, and form two minute flow paths 14 each constituting an approximately rectangular flow path cross-sectional shape and having a flow path cross-sectional area of approximately two times that of the aforementioned minute flow paths 13. These two minute flow paths 14 are formed, for example, at the sides of the grid element 12, by removing the plate-shaped partitions that compartmentalize two adjacent minute flow paths 13. Also, as shown in FIG. 9, mesh elements (wire netting) 15 (15a, 15b, 15c, 15d) sandwiched between each of the grid elements 12 (12a, 12b to 12e) and superimposed in the fluid throughflow direction form a plurality of flow paths extending in the fluid throughflow direction. Furthermore, each of the aforementioned mesh elements (wire netting) 15 exclusively performs the role of straightening the flow of fluid through the above-described grid element 12.

Incidentally, the abovementioned plurality (multiplicity) of minute flow paths 13 compartmentalized by the grid elements 12 (12a, 12b to 12e), if perceived collectively, can be considered as forming a flow path having a large flow path cross-sectional area. Moreover, these minute flow paths 13, 14 exhibit different flow path resistances to the flow of fluid according to differences in their respective flow path cross-sectional areas. Accordingly, the minute flow paths 13 collectively can be considered as corresponding to the above-described second flow path 3, and the above-described two minute flow paths 14 can be considered as corresponding to the above-described first flow path 2.

Furthermore, as shown in FIG. 10, at one of the two minute flow paths 14 formed in the sensor grid element 12 is provided a nozzle 14a at an approximately intermediate location of the flow path, and the flow path cross-sectional area thereof is constricted. The minute flow path 14 provided with this nozzle 14a is used for minute flow rate detection (low velocities), and a low velocity-use flow rate sensor 16a is incorporated at the location where the abovementioned nozzle 14a constricts the flow path cross-sectional area. Moreover, the other minute flow path 14 is used for large flow rate detection (high velocity-use) and a high velocity-use flow rate sensor 16b is incorporated at an approximately intermediate location thereof. These two minute flow paths 14, if considered as flow paths that are separated from the above-described collective minute flow paths 13, can be perceived as the first and second flow paths 2, 3 whose flow divergence ratio changes in accordance with the above-described flow rate.

In a flow meter having a flow path structure that uses this type of grid element 12 to compartmentalize flow paths, the flow path cross-sectional area of each of the plurality of minute flow paths 13 that constitute the second flow path 3 is narrower than that of the minute flow paths 14 which incorporate flow rate sensors 16a, 16b, and due to their higher flow path resistance, in the case of a minute flow rate of fluid through the pipe 11, the fluid flows primarily to the minute flow paths 14 having smaller flow path resistance. Moreover, as the flow rate of fluid through the pipe 11 increases, the fluid overcomes the flow resistance of the abovementioned minute flow paths 13 and also flows into the minute flow paths 13.

As a result, as the fluid flow rate increases, the flow diversion ratio among the fluid flow rate into the aforementioned minute flow paths 13 and the fluid flow rate into the minute flow paths 14 changes. Then, as the flow rate increases, an increase in the flow rate of fluid through the minute flow paths 14 provided with flow rate sensors 16a, 16b is gradually constrained. Accordingly, the detection accuracy of minute flow rates by the flow rate sensors 16a, 16b provided in the minute flow paths 14 is increased, and in the case of a large flow rate throughflow, the flow can be diverted among the minute flow paths 14 so as to constrain the flow rate therein, thus enabling flow rate detection to be implemented while constraining the saturation of the abovementioned flow rate sensors 16a, 16b.

Moreover, in a flow meter having the aforementioned flow path structure, at an approximate intermediate location of the one minute flow path 14 that incorporates the low velocity-use flow rate sensor 16a, a nozzle 14a that constricts the flow path cross-sectional area thereof is provided as described above. Then, the aforementioned first and second front grid elements 12b, 12c provided upstream from the sensor grid element 12a providing with this nozzle 14a form an inlet zone for the fluid flowing into the minute flow path 14, and all the fluid that has flowed into this inlet zone is fed to the aforementioned nozzle 14a. As a result, the flow velocity of fluid having flowed into the minute flow path 14 increases due to the constriction of the flow path cross-sectional area by the aforementioned nozzle 14a, and the low velocity-use flow rate sensor 16a provided in the nozzle 14a of the aforementioned minute flow path 14 is able to detect minute flow rates with higher accuracy. In particular, the aforementioned low velocity-use flow rate sensor 16a is able to detect minute flow rates with higher accuracy than the high velocity-use flow rate sensor 16b provided in the other minute flow path 14 wherein the nozzle 14a is not formed.

Figure 11:
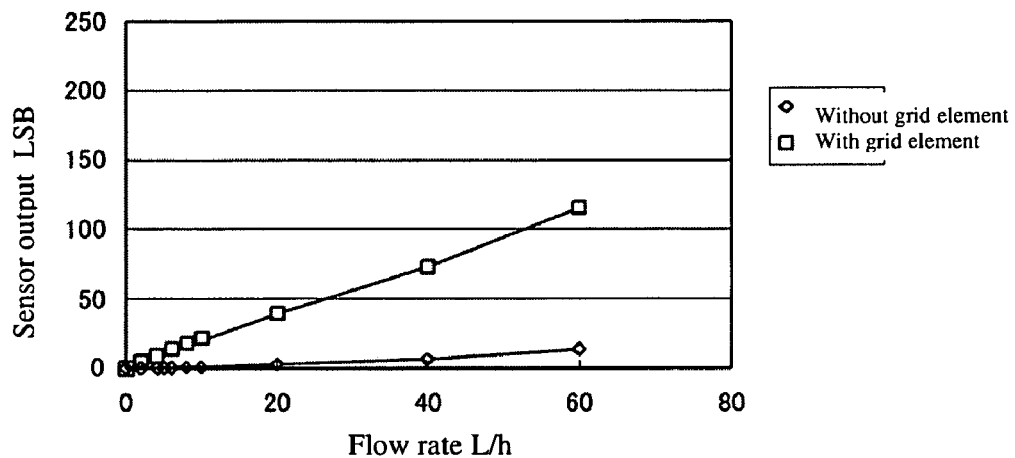
FIG. 11 shows experimental data of the change in flow rate sensor output for minute flow rates and verifies the improvement in detection sensitivity for minute flow rates in the flow meter shown in FIG. 9.

FIG. 11 shows experimental data that verifies the improvement in flow rate detection sensitivity in a flow path structure provided with the above-described grid element 12 and having a flow path compartmentalized into a plurality of minute flow paths 13, 14, and contrasts the flow rate sensor output in the case when the grid element 12 is not provided to the case where the grid element 12 is provided. This experimental data substantiates the improvement in sensitivity of flow rate detection by the flow rate sensors 16a, 16b in the case in which the grid element 12 is provided and the flow path is compartmentalized into minute flow paths 13, 14 compared to the case in which the flow path not provided with the grid element 12. Moreover, although not explicitly shown, the experimental data reveals that a longer length of the grid element 12 attains a greater improvement in detection sensitivity, and the reason for such is believed to be due to the increasing difference in change in flow path resistance among the aforementioned plurality of minute flow paths 13, 14 as the length (flow path length) of the grid element 12 increases.

Figure 12:
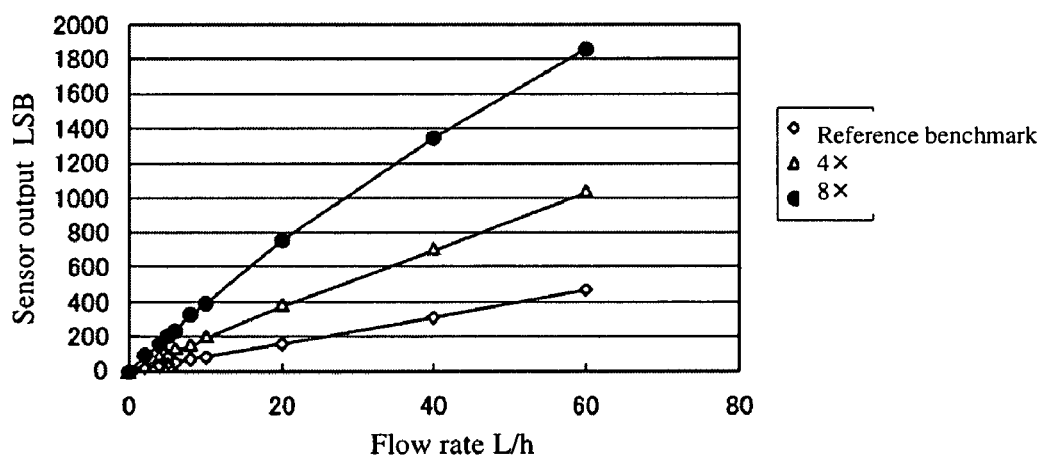
FIG. 12 shows the change in flow rate sensor output for minute flow rates when the ratio of flow path cross-sectional areas (width of openings) is changed.

Moreover, FIG. 12 shows the change in flow rate sensor output for minute flow rates when the ratio of flow path cross-sectional areas (width of openings) of the plurality of minute flow paths 13, 14 formed by the grid element 12 is changed. Furthermore, the reference benchmark in FIG. 11 shows the case in which the opening widths (flow rate cross-sectional areas) of the minute flow paths 14 provided with the flow rate sensors 16 are equal to the opening widths (flow rate cross-sectional areas) of the other minute flow paths 13. Additionally, the parameters indicated as 4× and 8× show the cases in which the opening widths (flow rate cross-sectional areas) of the minute flow paths 14 provided with the flow rate sensors 16 are set to 4× and 8×, respectively, of the opening widths (flow rate cross-sectional areas) of the minute flow paths 13.

The experimental data shown in FIG. 12 substantiates the improvement in sensitivity of minute flow rate detection by the flow rate sensors 16 achieved by making the opening widths (flow rate cross-sectional areas) of the minute flow paths 14 provided with flow rate sensors 16 larger than the opening widths (flow rate cross-sectional areas) of the other minute flow paths 13 so that fluid in a minute flow rate region encounters difficulty in flowing into the aforementioned minute flow paths 13, and correspondingly, a larger flow rate will flow into the aforementioned minute flow paths 14 provided with the flow rate sensors 16.

Figure 13:
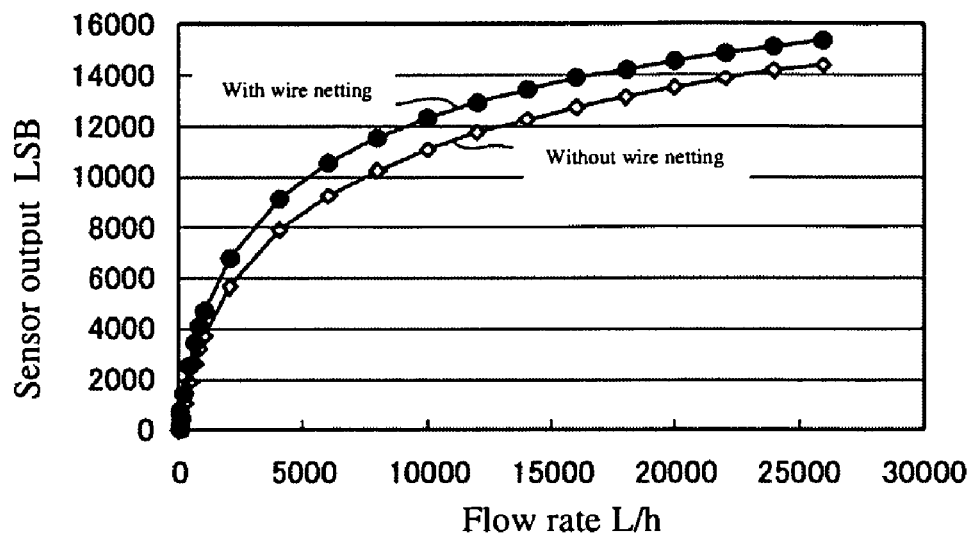
FIG. 13 contrasts sensor outputs that change according to whether or not a mesh element exists.

Moreover, FIG. 13 verifies the effect of the presence of the above-described mesh element (wire netting) 15, and contrasts the change in sensor output over the range from a minute flow rate to a large flow rate. Furthermore, the case shown in which the mesh element (wire netting) 15 is not provided is the case in which the mesh element (wire netting) 15 has been omitted from the above-described flow path structure shown in FIG. 9, or in other words, the case in which the flow path structure is configured with only the grid element 12.

As is evident from the characteristics shown in FIG. 13, the provision of the mesh element (wire netting) 15 causes the straightening effect on the flows passing through each of the minute flow paths 13, 14 to become more prominent, enabling not only the detection of a stabilized flow rate, but also increased instantaneous flow rate measurement accuracy. Moreover, as can be seen from the experimental data shown in FIG. 13, the sensor output changes abruptly in response to changes in the flow rate in the minute flow rate region, and the detection sensitivity by the aforementioned flow rate sensors 16 in the minute flow rate region is high. Moreover, at this time, as the flow rate increases, the change in sensor output in response to the flow rate change broadens, indicating that the detection sensitivity by the aforementioned flow rate sensors 16 in the large flow rate region is gradually constrained lower.

The constraining of detection sensitivity of the aforementioned flow rate sensors 16 in this large flow rate region is due to the pressure drop at the above-described nozzle 14a which increases proportionally to the square of the flow velocity (flow rate), and as a result thereof, the flow rate passing through the nozzle 14a (minute flow paths 14) is limited and the flow rate into the minute flow paths 13 increases. Also, with a flow meter that has adopted the abovementioned flow path structure, flows ranging from a minute flow rate to a large flow rate can be measured continuously, without causing the flow rate sensors 16 to saturate.

Figure 14:
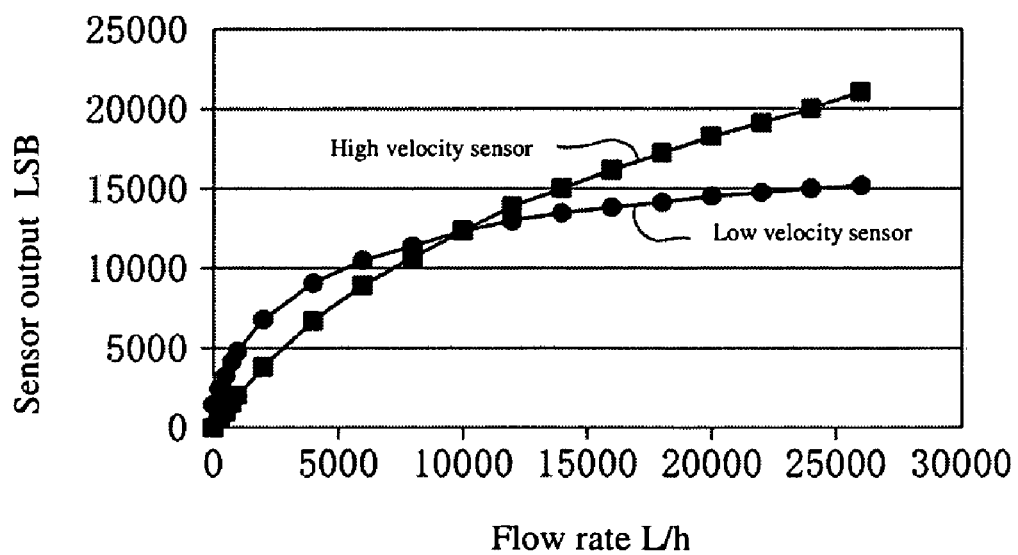
FIG. 14 shows the change in sensor output in response to the flow rates at the low velocity-use flow rate sensor and the high velocity-use flow rate sensor in the first embodiment.

Moreover, FIG. 14 shows the change in sensor output in response to the flow rate at the low velocity-use flow rate sensor 16a and the high velocity-use flow rate sensor 16b provided in the above-described two minute flow paths 14 respectively. As is evident from the data shown in FIG. 14, as the flow rate increases, the rate of change of the output of the low velocity-use flow rate sensor 16a, which is provided in the minute flow path 14 that is provided with the nozzle 14a and has a constricted flow path cross-sectional area, is constrained and a broad rate of change is exhibited. This phenomenon is caused by constraining the flow rate of fluid through the nozzle 14 which accompanies the pressure drop at the aforementioned nozzle 14a. Conversely, on the side of the minute flow path 14 provided with the high velocity-use flow rate sensor 16b, since the nozzle 14a is not provided, as the flow rate increases the rate of change of the sensor output is only constrained by the portion dependent on the change in flow diversion ratio among the minute flow paths 14 and the above-described minute flow paths 13.

These experimental results indicate that the flow rate at the minute flow paths 14, the flow divergence ratio thereof changing with respect to the minute flow paths 13, can be caused to change additionally depending on whether the nozzle 14a has been provided in the minute flow paths 14, and that by providing the nozzle 14a, the rate of change of the aforementioned flow diversion ratio is increased further, enabling increased detection sensitivity in the minute flow region. Accordingly, the provision of the low velocity-use flow rate sensor 16a and the high velocity-use flow rate sensor 16b, respectively, in the above-described two minute flow paths 14 enables continuous measurement with distinct detection characteristics from the minute flow rate region to the large flow rate region, and enables compensation for deficiencies in the accuracy of measurement in the low flow rate region side and the high flow rate region side by the flow rate sensors 16a, 16b.

Figure 15:
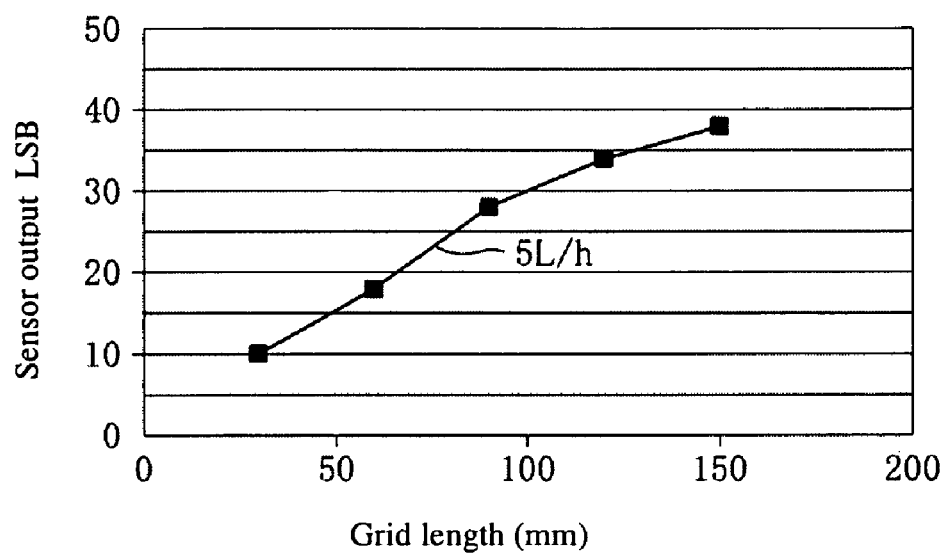
FIG. 15 shows sensor output characteristics that change according to different lengths of the grid elements

Furthermore, FIG. 15 shows sensor output characteristics that change according to differences in the length (flow path length) of the grid element 12. This experimental data indicates that the longer the length of the grid element 12, the less effective the pressure drop at the nozzle 14a becomes, and the sensor output can be increased. This phenomenon is believed to be caused by the comparatively smaller change in the flow rate flowing into the minute flow paths 14 than the change in flow rate through the main flow path due to the greater compressibility of the fluid (gas) for longer flow path lengths of the minute flow paths 13, 14 compartmentalized by the grid element 12, and particularly for a longer inlet zone on the upstream side of the nozzle 14a. Accordingly, ensuring a certain length for the inlet zone of the minute flow paths 14 and elongating the length of the grid element 12a for stabilizing the flow path resistance thereof enables the flow diversion ratio among minute flow paths 13, 14 to change, regardless of the existence of the nozzle 14a, in accordance with the flow rate (flow velocity) of fluid flowing through the pipe 11, and therefore, such a configuration is said to be highly preferred for detecting minute flow rates with high sensitivity.

Incidentally, as described above, by providing a mesh-free area 7a in a portion of the mesh element 7 so as to cover the flow path cross-sectional area, differences arise in the fluid flow through the mesh-free area 7a and the fluid flow through the mesh element 7, and downstream from the mesh element 7 is formed a region (the first and second flow paths 2, 3) of different flow rates (flow velocities). Accordingly, the accuracy with which minute flow rates are detected can be enhanced further by additionally incorporating a mesh element (wire netting) equipped with a mesh-free area into the flow path structure that uses the grid element 12 shown in FIG. 9 to form two types of minute flow paths 13, 14.

Figure 16:
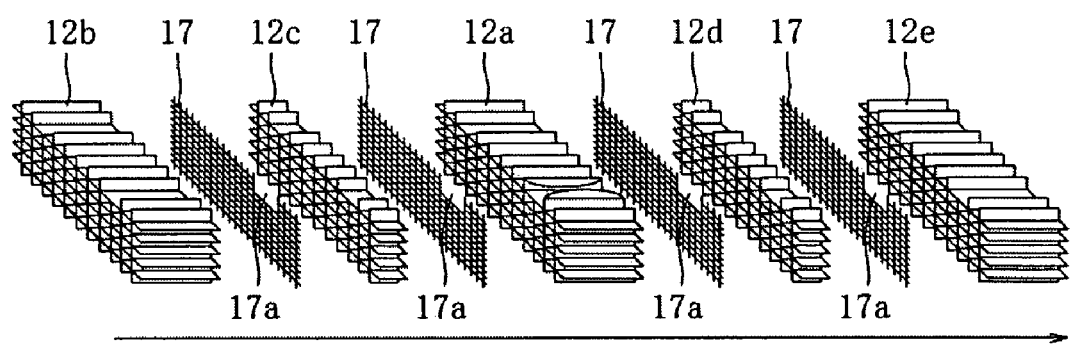
FIG. 16 shows the flow path structure of the flow meter of the second embodiment of the present invention, in an exploded diagrammatic view in the fluid throughflow direction.
Figure 17:
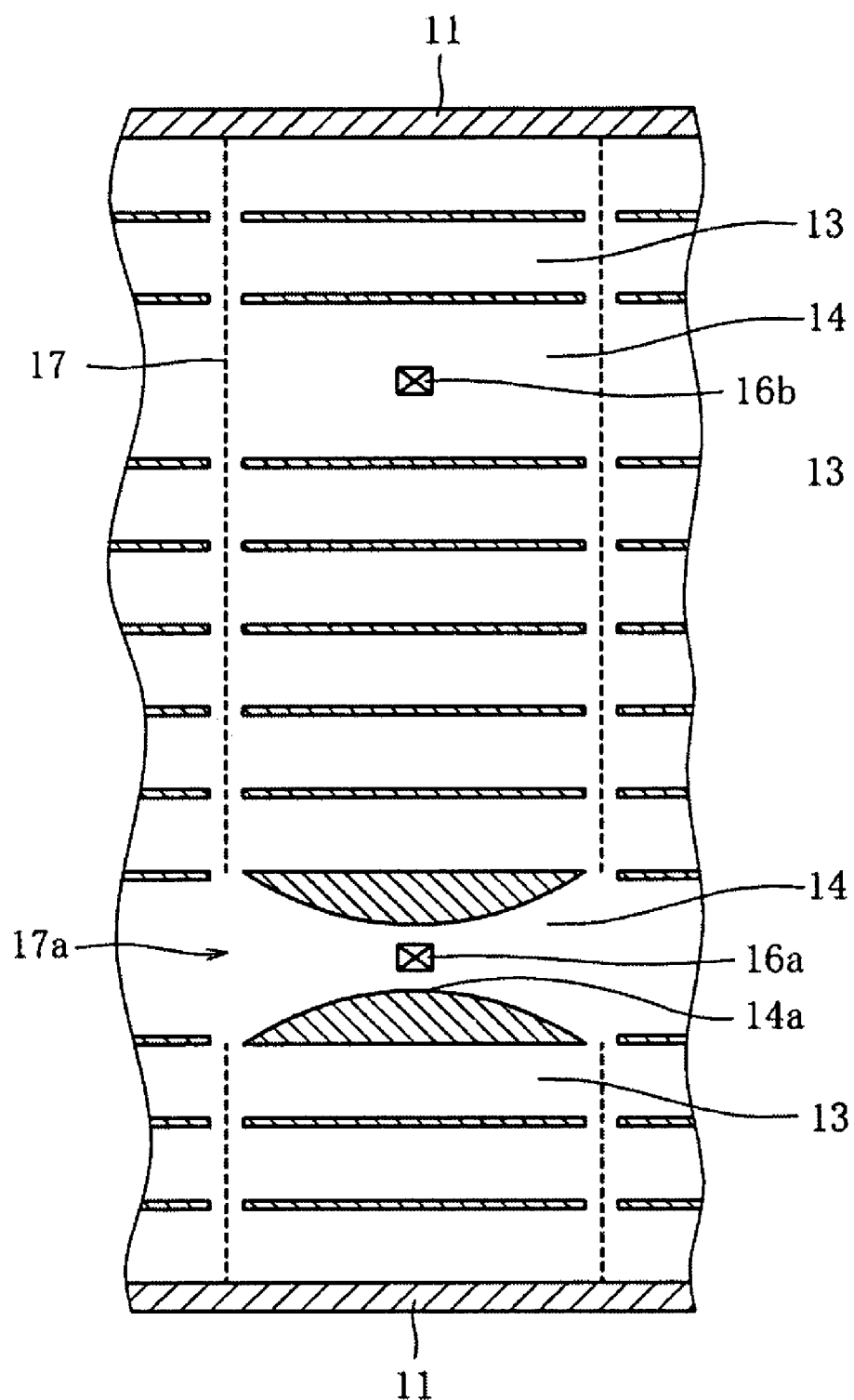
FIG. 17 shows diagrammatically the cross-sectional structure of the relevant part of the flow path in the flow meter shown in FIG. 16.

FIG. 16 shows an exploded diagrammatic view in the fluid throughflow direction of the flow path structure of a flow meter in a second embodiment of the present invention realized with this type of perspective, and FIG. 17 shows the cross-sectional structure of a relevant part thereof in a diagrammatic view. Furthermore, the grid elements 12 (12a, 12b to 12e) are similar to those of the above-described embodiment. Moreover, this second embodiment differs from the above-described first embodiment in that a mesh element (wire netting) 17 formed with a rectangular shaped mesh-free area 17a is used as the mesh element sandwiched between each of the aforementioned grid elements 12 (12a, 12b to 12e), and particularly in that the location of the rectangular shaped mesh-free area 17a corresponds to the location at which the minute flow path 14 provided with the nozzle 14a is formed.

In a flow meter realized by forming the above-described flow path structure, since the flow rate into the minute flow path 14 in the minute flow rate region increases by the amount that the flow path resistance (pressure drop) is reduced at the minute flow path 14, which is positioned at the mesh-free area 17a and where no mesh element (wire netting) exists, the detection sensitivity for minute flow rates can be increased above the level of the previous embodiment. To verify this type of effect, sensor output was investigated in the minute flow region and experimental results as shown in FIG. 18 were obtained for the case where the mesh element (wire netting) 17 formed with the mesh-free area 17a is not used (first embodiment), the case in which only one mesh element (wire netting) 17 formed with a mesh-free area 17a is used, and similarly, the case in which two are used and the case in which three are used, all are formed with the mesh-free areas 17a.

Figure 18:
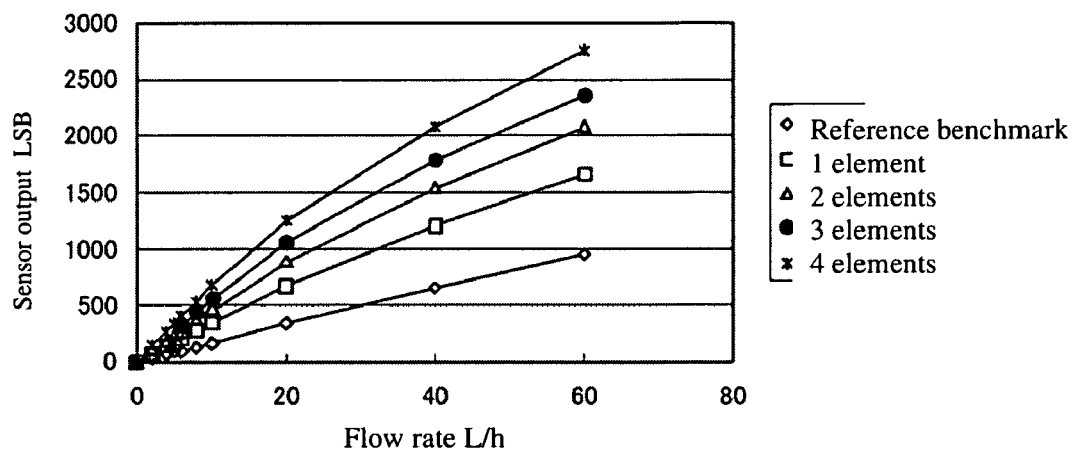
FIG. 18 shows the change in sensor output in the minute flow rate region that changes according to whether or not a mesh-free area exists.

As is evident from the experimental data shown in FIG. 18, when using a greater number of mesh elements 17 formed with mesh-free areas 17a, the sensor output increases, the throughflow resistance (pressure drop) due to the mesh elements 17 increases the flow diversion ratio among minute flow paths 13, 14, and this configuration is effective in feeding nearly all of the minute flow rate of flow to the minute flow paths 14 that incorporate the flow rate sensors 16. Accordingly, a minute flow rate of approximately 5 [L/h] due to a leak can be detected with high sensitivity.

Figure 19:
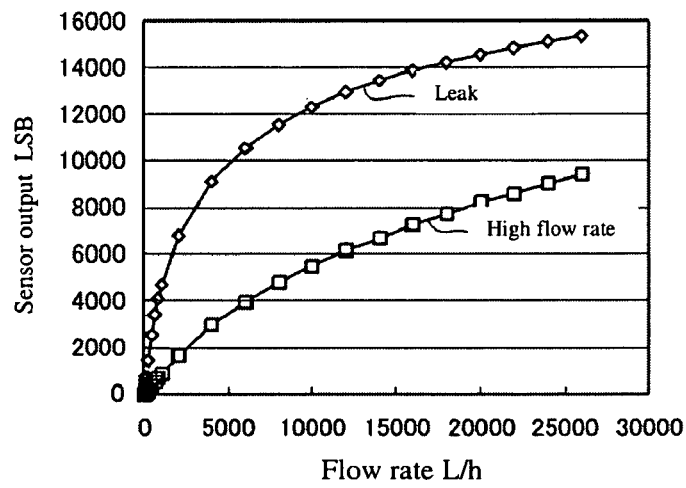
FIG. 19 shows the change in sensor output corresponding to the flow rate of the low velocity-use flow rate sensor and the high velocity-use flow rate sensor in the second embodiment.

Moreover, FIG. 19 shows output characteristics of the low velocity-use flow rate sensor 16a and the high velocity-use flow rate sensor 16b in a flow meter configured as described above. As shown in the output characteristics of each of the sensors 16a, 16b, a low velocity-use flow rate sensor 16a incorporated into the minute flow path 14 provided with the nozzle 14a and positioned at the location where the mesh-free area 17a is formed enables the detection sensitivity to be increased sufficiently in the minute flow rate region. Furthermore, the detection sensitivity in the large flow rate region decreases by the amount that the detection sensitivity has been increased sufficiently in the minute flow rate region.

On the other hand, with a high velocity-use flow rate sensor 16b incorporated into the minute flow path 14 provided with the mesh element 17 and not having a nozzle 14a, although the detection sensitivity for the minute flow region cannot be increased very high, the detection sensitivity across the entire measurement range, from the minute flow rate region to the large flow rate region, can be made approximately uniform. Accordingly, by monitoring the output of each of the low velocity-use flow rate sensor 16a and the high velocity-use flow rate sensor 16b, the flow rate can be detected with good accuracy over the entire measurement range from minute flow rates of approximately 5 [L/h] caused by leaks to large flow rates of approximately 30,000 [L/h] maximum during the normal usage state, and this has many practical advantages. Moreover, by contrasting the output of each of these flow rate sensors 16a, 16b, the deterioration over time of the sensor characteristics can be monitored and other advantages provided.

However, the present invention is not limited to the above-described embodiments. For example, the ratio of the flow rate cross-sectional areas of the first and second flow paths 2, 3 may be determined according to measurement specifications or the like, or may be determined according the viscosity or the like that differs according to the type of fluid. Moreover, in the embodiments shown in FIG. 10 and FIG. 17, grid elements are provided upstream and downstream from the sensor grid element 12a so that the flow path structure is symmetrical in the fluid throughflow direction. In this type of symmetrical flow path structure, there is concern that the fluid throughflow direction may invert, but in the case where the fluid throughflow direction is determined in a unified way, only on the upstream side of the sensor grid element 12a may grid elements 12b, 12c may be provided. Moreover, the length of the flow path formed thusly with grid elements 12 may also be determined according to the specifications.

The above-described mesh elements 7, 15, 17 are not only wire netting and may also be elements such as a honeycomb structure or perforated metal. Furthermore, the above-described grid elements 12, instead of forming a rectangular shaped flow path cross-sectional area, may also form a so-called honeycomb-type hexagonally shaped flow path cross-sectional area or triangular shaped flow path cross-sectional area. Moreover, various modifications can be made without departing from the scope of the invention.

The invention claimed is:

1. A flow meter comprising:
   first and second flow paths, provided in parallel and through which flows fluid having flowed through and being diverted from a main flow path, the flow diversion ratio among the first and second flow paths changing passively in accordance with the flow rate of fluid through the main flow path; and
   a flow rate sensor provided on at least one of the first and second flow paths,
   wherein the first flow path comprises a laminar flow region formed downstream from a mesh-free area provided on a portion of a mesh element provided so as to cover the entire flow path cross-section of the main flow path; and
   wherein the second flow path is formed as a region outside the laminar flow region downstream from the mesh element by equivalently compartmentalizing the space between the laminar flow region and the flow path cross-section of the main flow path.

2. The flow meter cited in claim 1, wherein the first and second flow paths are formed by spatially compartmentalizing the flow path cross-section of the main flow path along the direction of fluid flow through the main flow path.

3. The flow meter cited in claim 1, wherein at least one of the first and second flow paths is caused to passively change its flow path resistance to the fluid in accordance with the flow rate of the fluid through the main flow path, and the flow diversion ratio among the first and second flow paths is caused to change.

4. The flow meter cited in claim 1, wherein the first and second flow paths are formed by compartmentalizing the flow path cross-section of the main flow path with partitions provided along the direction of fluid flow through the main flow path; and
   the first flow path is formed as a flow path space having a smaller flow path cross-section than that of the second flow path.

5. The flow meter cited in claim 4, wherein the first flow path, after having secured an inlet zone for the fluid flow, has a narrow area that constricts the flow path cross-sectional area, and the flow rate sensor is incorporated into this narrow area.

6. The flow meter cited in claim 1, wherein the mesh element provided with the mesh-free area is provided as a plurality of mesh elements in which the locations of the mesh-free areas thereof are aligned in the throughflow direction of the fluid.

7. The flow meter cited in claim 1, wherein the first and second flow paths are formed by compartmentalizing the flow path cross-section of the main flow path with partitions provided along the fluid throughflow direction of the main flow path, and
   the second flow path is provided with a paddle mechanism that changes the flow path resistance for the fluid according to the velocity of fluid flow, and the flow diversion ratio between the first and second flow paths varies according to the flow path resistance of the second flow path that changes according to the degree of opening of the paddle mechanism.

8. A flow meter as cited in claim 1, wherein the second flow path is provided with grid-shaped partition plates that compartmentalize the second flow path into a plurality of parallel minute flow paths along the fluid flow.

9. The flow meter as cited in claim 1, wherein the flow meter additionally comprises a second flow rate sensor in the second flow path.

10. A flow meter comprising:
    first and second flow paths, provided in parallel and through which flows fluid having flowed through and being diverted from a main flow path, the flow diversion ratio among the first and second flow paths changing passively in accordance with the flow rate of fluid through the main flow path; and
    a flow rate sensor provided on at least one of the first and second flow paths, wherein the first flow path comprises a laminar flow region formed downstream from a mesh-free area provided on a portion of a mesh element provided so as to cover the entire flow path cross-section of the main flow path;
    wherein the first and second flow paths are formed by compartmentalizing the flow path cross-section of the main flow path with partitions provided along the direction of fluid flow through the main flow path;
    wherein the first flow path is formed as a flow path space having a smaller flow path cross-section than that of the second flow path;
    wherein the first flow path, after having secured an inlet zone for the fluid flow, has a narrow area that constricts the flow path cross-sectional area, and the flow rate sensor is incorporated into this narrow area; and
    wherein the mesh-free area provided on a portion of the mesh element is formed as a region smaller than the flow path cross-section of the main flow path.

11. A flow meter comprising:
    first and second flow paths, provided in parallel and through which flows fluid having flowed through and being diverted from a main flow path, the flow diversion ratio among the first and second flow paths changing passively in accordance with the flow rate of fluid through the main flow path; and
    a flow rate sensor provided on at least one of the first and second flow paths,
    wherein at least one of the first and second flow paths is caused to passively change its flow path resistance to the fluid in accordance with the flow rate of the fluid through the main flow path, and the flow diversion ratio among the first and second flow paths is caused to change, wherein the second flow path is provided with grid-shaped partition plates that compartmentalize the second flow path into a plurality of parallel minute flow paths along the fluid flow, wherein the grid-shaped partition plates form grid elements of a predetermined length, and wherein in the second flow path, a plurality of the grid elements are arranged in series in the fluid throughflow direction, and a mesh element is interposed between each of these grid elements.

12. The flow meter as cited in claim 11, wherein the first flow path, after having secured an inlet zone for the fluid flow, has a narrow area that constricts the flow path cross-sectional area, and the flow rate sensor is incorporated into this narrow area.

13. The flow meter as cited in claim 1, wherein the first flow path, after having secured an inlet zone for the fluid flow, has a narrow area that constricts the flow path cross-sectional area, and the flow rate sensor is incorporated into this narrow area, and wherein the mesh-free area provided on a portion of the mesh element is formed as a region smaller than the flow path cross-section of the main flow path.

14. The flow meter as cited in claim 13, wherein the grid-shaped partition plates form grid elements of a predetermined length, and wherein in the second flow path, a plurality of the grid elements are arranged in series in the fluid throughflow direction, and a mesh element is interposed between each of these grid elements.

* * * * *